US012644720B2

(12) United States Patent　　(10) Patent No.: US 12,644,720 B2
Xu　　(45) Date of Patent: Jun. 2, 2026

(54) DRIVINGS INSIGHTS WITH ALTERNATIVE POWER SOURCES

(71) Applicant: Toyota Motor Engineering & Manufacturing North America, Inc., Plano, TX (US)

(72) Inventor: Lu Xu, Canton, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 55 days.

(21) Appl. No.: 18/792,291

(22) Filed: Aug. 1, 2024

(65) Prior Publication Data

US 2026/0036431 A1　　Feb. 5, 2026

(51) Int. Cl.
　　*G01C 21/34*　　(2006.01)
　　*B60K 35/28*　　(2024.01)
(52) U.S. Cl.
　　CPC .......... *G01C 21/3469* (2013.01); *B60K 35/28* (2024.01)
(58) Field of Classification Search
　　CPC ..... G01C 21/34; G01C 21/3469; B60K 35/28
　　USPC ........................................ 701/123
　　See application file for complete search history.

(56) References Cited

U.S. PATENT DOCUMENTS

| | | | | |
|---|---|---|---|---|
| 7,072,762 | B2 * | 7/2006 | Minami | G01F 9/023 |
| | | | | 340/439 |
| 7,233,855 | B1 | 6/2007 | Kidston et al. | |
| 8,630,792 | B2 | 1/2014 | Smith | |
| 10,844,820 | B2 | 11/2020 | Meroux et al. | |
| 10,890,459 | B2 | 1/2021 | Matsumura et al. | |
| 11,535,230 | B2 | 12/2022 | Higuchi et al. | |
| 2005/0278079 | A1 | 12/2005 | Maguire | |
| 2011/0172871 | A1 * | 7/2011 | Hall | B60W 50/0097 |
| | | | | 340/439 |
| 2012/0239562 | A1 | 9/2012 | Rich et al. | |
| 2013/0073267 | A1 | 3/2013 | Gearhart et al. | |
| 2015/0302670 | A1 * | 10/2015 | Ulrey | B60W 40/00 |
| | | | | 701/123 |
| 2017/0298849 | A1 | 10/2017 | Be et al. | |
| 2019/0039512 | A1 | 2/2019 | Taki et al. | |
| 2024/0037629 | A1 | 2/2024 | McClung et al. | |

FOREIGN PATENT DOCUMENTS

| | | |
|---|---|---|
| DE | 102009006466 A1 | 9/2009 |
| DE | 102010011088 B4 | 11/2021 |
| EP | 2151362 B1 | 10/2012 |
| JP | 4508182 B2 | 7/2010 |

* cited by examiner

*Primary Examiner* — Logan M Kraft
*Assistant Examiner* — Johnny H Hoang
(74) *Attorney, Agent, or Firm* — Snell & Wilmer LLP

(57) ABSTRACT

Methods, systems, and apparatus for providing driving insights includes a driving insights module programed to receive a set of vehicle conditions, receive a fuel consumption database, and calculate a fuel savings of the vehicle based upon the set of vehicle conditions and the fuel consumption database. For example, the driving insights module can calculate the fuel saved by using an alternative power source compared to the fuel that would have been used by a vehicle operated by an internal combustion engine. In response to detecting an ignition off event, the driving insights module can generate the fuel savings estimate. The driving insights module can further output for display the fuel savings estimate.

20 Claims, 6 Drawing Sheets

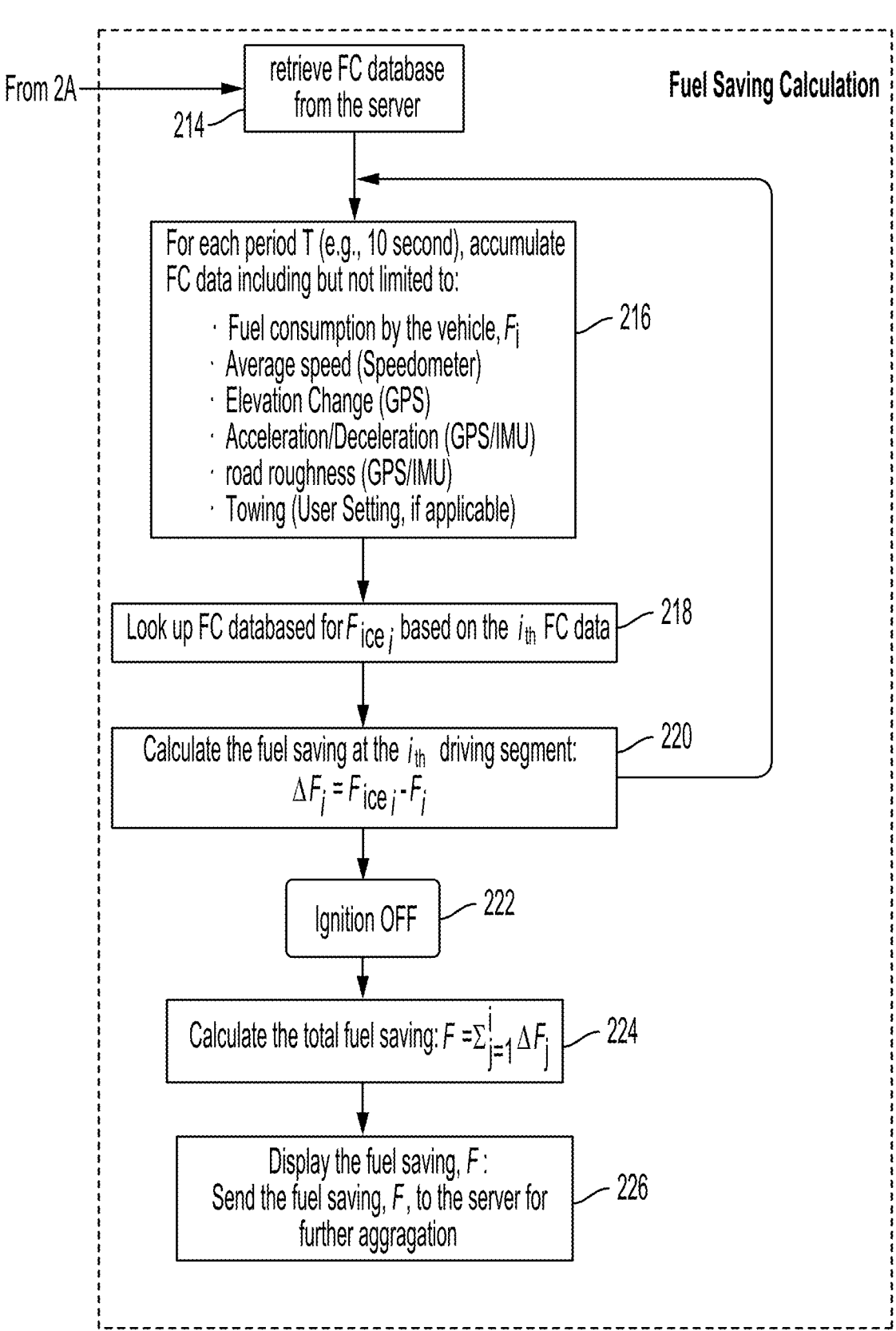

From 2A → retrieve FC database from the server — 214

Fuel Saving Calculation

For each period T (e.g., 10 second), accumulate FC data including but not limited to: — 216

· Fuel consumption by the vehicle, $F_i$
· Average speed (Speedometer)
· Elevation Change (GPS)
· Acceleration/Deceleration (GPS/IMU)
· road roughness (GPS/IMU)
· Towing (User Setting, if applicable)

Look up FC databased for $F_{ice\,i}$ based on the $i_{th}$ FC data — 218

Calculate the fuel saving at the $i_{th}$ driving segment: — 220
$$\Delta F_i = F_{ice\,i} - F_i$$

Ignition OFF — 222

Calculate the total fuel saving: $F = \sum_{j=1}^{i} \Delta F_j$ — 224

Display the fuel saving, $F$:
Send the fuel saving, $F$, to the server for further aggragation — 226

FIG. 2B

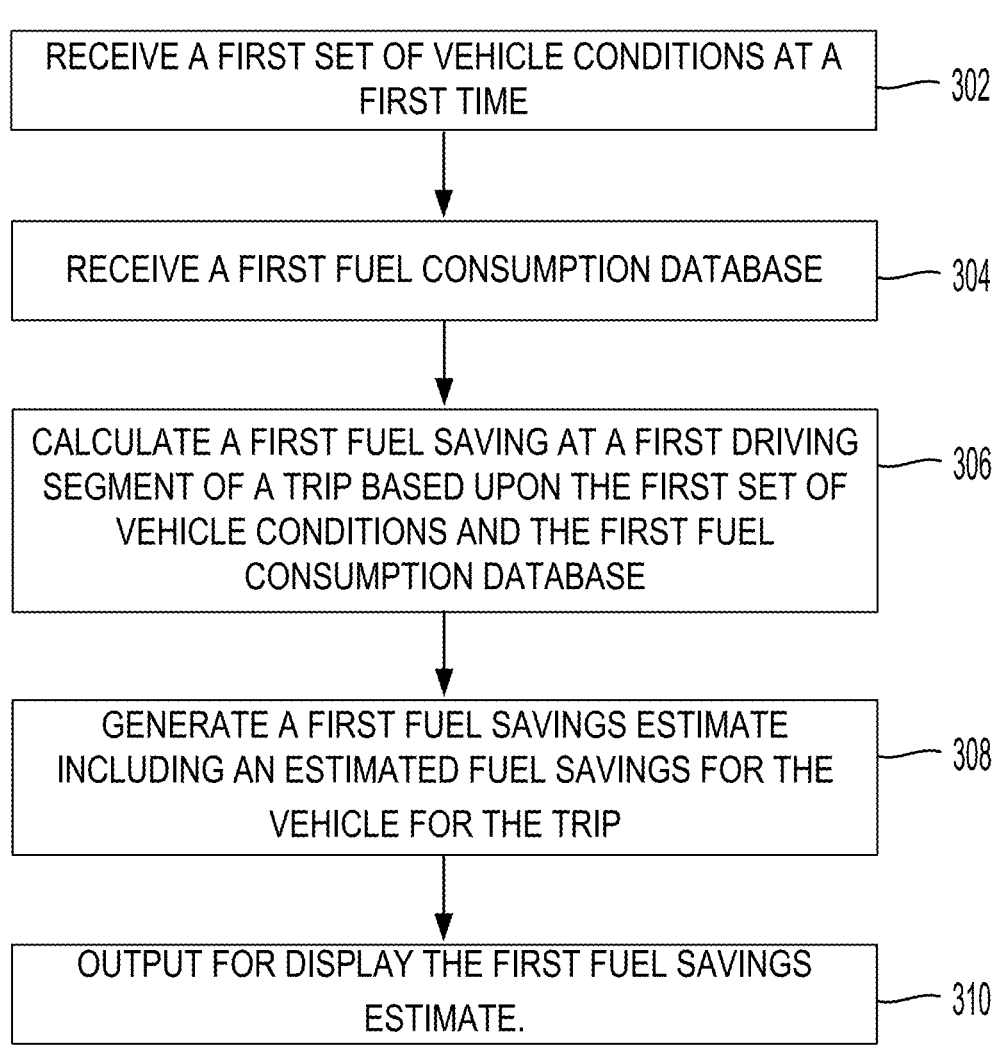

300

RECEIVE A FIRST SET OF VEHICLE CONDITIONS AT A
FIRST TIME —— 302

RECEIVE A FIRST FUEL CONSUMPTION DATABASE —— 304

CALCULATE A FIRST FUEL SAVING AT A FIRST DRIVING
SEGMENT OF A TRIP BASED UPON THE FIRST SET OF
VEHICLE CONDITIONS AND THE FIRST FUEL
CONSUMPTION DATABASE —— 306

GENERATE A FIRST FUEL SAVINGS ESTIMATE
INCLUDING AN ESTIMATED FUEL SAVINGS FOR THE
VEHICLE FOR THE TRIP —— 308

OUTPUT FOR DISPLAY THE FIRST FUEL SAVINGS
ESTIMATE. —— 310

FIG. 3

Building Fuel Consumption Database

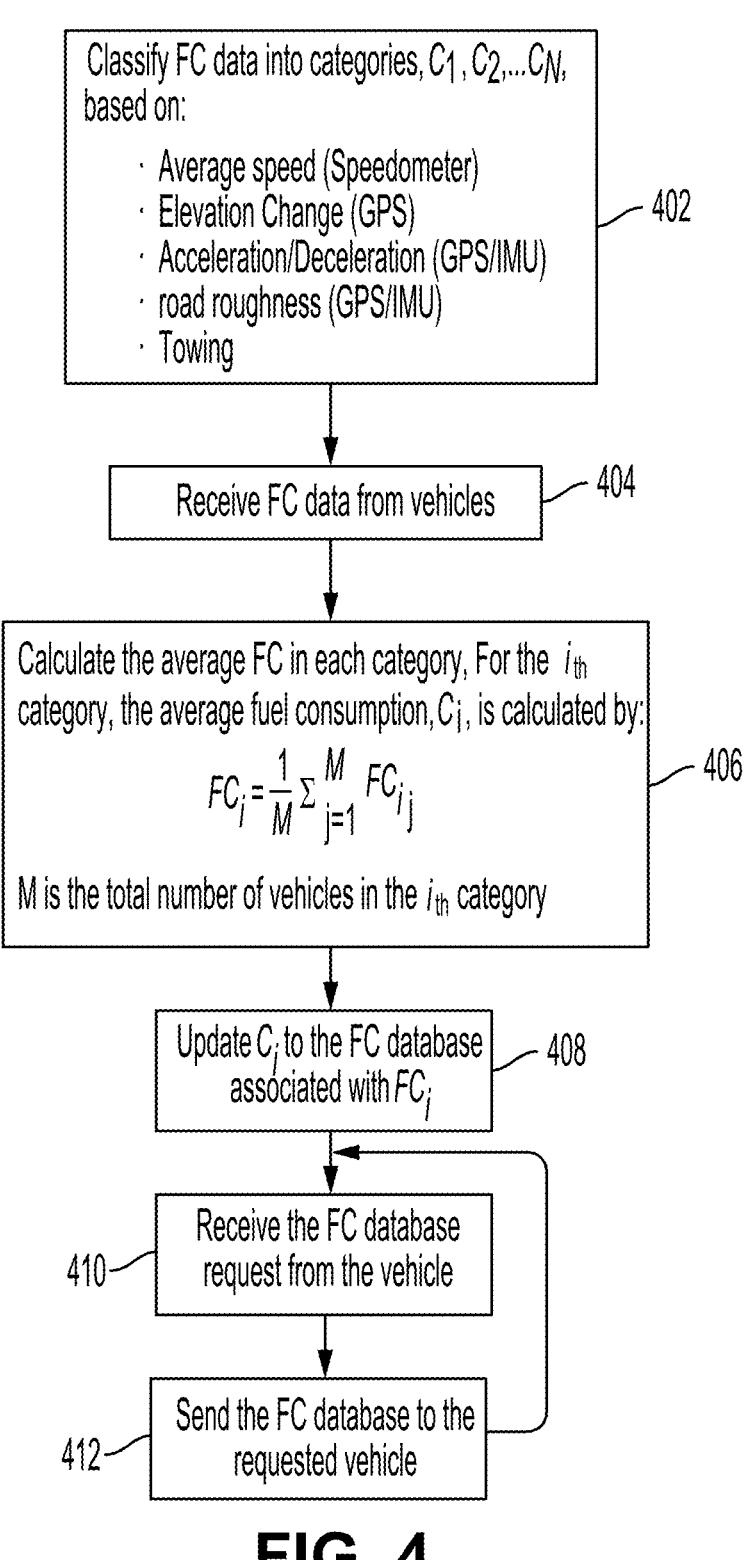

Classify FC data into categories, $C_1, C_2, ... C_N$, based on:

· Average speed (Speedometer)
· Elevation Change (GPS)
· Acceleration/Deceleration (GPS/IMU)
· road roughness (GPS/IMU)
· Towing

— 402

Receive FC data from vehicles — 404

Calculate the average FC in each category, For the $i_{th}$ category, the average fuel consumption, $C_i$, is calculated by:

$$FC_i = \frac{1}{M} \sum_{j=1}^{M} FC_{ij}$$

M is the total number of vehicles in the $i_{th}$ category

— 406

Update $C_i$ to the FC database associated with $FC_i$ — 408

410 — Receive the FC database request from the vehicle

412 — Send the FC database to the requested vehicle

Odometer: 10,685 mi

⛽ 201 mi
Distance to empty

🚗 Vehicle

Lock    Start    Unlock

Remote & Sharing
⌄

Last Updated: Yesterday at 11:17 PM

Vehicle Status
Unlocked

Hybrid Insights

Driving Time
*EV Time*                                    67%

You've saved *128* gallons of gas by choosing Toyota hybrid

Assist    Finance    🚗    Shop    Find

DRIVINGS INSIGHTS WITH ALTERNATIVE POWER SOURCES

BACKGROUND

Field

The present disclosure relates generally to systems and methods for automated collection and analysis of information related to fuel-savings features in a vehicle and, more particularly, to systems and methods for displaying selected items of such information to a driver or other user of the vehicle.

Description of the Related Art

Internal combustion engine (ICE) vehicles use fuel such as gasoline or diesel as a power source in which the fuel is combusted to provide locomotive force to the vehicle. Other alternative power source vehicles include electric vehicles (EVs), battery electric vehicle (BEVs), fuel cell electric vehicle (FCEVs), and hybrid vehicles, among others.

Technological developments for reducing discharge amount of heat-trapping gases and for further improving fuel efficiency are reflected in general to the price of a vehicle using the technology; therefore, the vehicle price becomes high. Meanwhile, when a vehicle is distributed, wherein the fuel efficiency thereof is improved and the drive energy cost thereof is low even with a high vehicle price, more detailed evaluation of pros and cons would be necessary for a vehicle purchaser to evaluate, in the relationship between the vehicle price, which is included in the initial cost of a vehicle, and the fuel consumption and drive energy cost, which are reflected to the running cost thereof. In other words, in the case of an electric vehicle, for example, the vehicle price is higher than existing gasoline vehicles, but the cost of electricity which is the drive energy for driving the vehicle is lower than the cost of the drive energy of a gasoline vehicle. Consequently, it is questioned what is an index with which it is possible to compare the cost effectiveness of an electric vehicle, of which the price is high, but the drive energy price is low, with the cost effectiveness of a gasoline vehicle, for example.

From this viewpoint, it would be important for the vehicle purchaser to compare/examine the relationship among the cost at the time of purchasing a vehicle, i.e., initial cost, the vehicle drive energy consumption cost which is a major part of the vehicle maintenance cost (running cost) thereof, and further, in the case of an electric vehicle comprising an electricity storing section capable of being charged as needed, the earning to be obtained by using the electricity storing section to an application other than driving the vehicle, with the relationships among other candidate vehicles for purchasing.

Accordingly, there is a need for a system and method for evaluating vehicle fuel savings for alternative power source vehicles.

SUMMARY

In general, one aspect of the subject matter described in this disclosure may be embodied in a system for providing driving insights for alternative power source vehicles. The system includes a driving insights module having a processor. The system further includes a tangible, non-transitory memory configured to communicate with the processor, the tangible, non-transitory memory having instructions stored thereon that, in response to execution by the processor, cause the driving insights module to perform operations. The operations include receiving a first set of vehicle conditions at a first time, receiving a first fuel consumption database, and calculating a first fuel saving at a first driving segment of a trip based upon the first set of vehicle conditions and the first fuel consumption database. The operations further include, responsive to detecting an ignition off event, generating a first fuel savings estimate including an estimated fuel savings for the vehicle for the trip, and outputting for display the first fuel savings estimate.

In another aspect, the subject matter may be embodied in a vehicle. The vehicle includes a driving insights module. The driving insights module is programmed to receive a first set of vehicle conditions at a first time, receive a first fuel consumption database, and calculate a first fuel saving at a first driving segment of a trip based upon the first set of vehicle conditions and the first fuel consumption database. Responsive to detecting an ignition off event, the driving insights module is programmed to generate a first fuel savings estimate including an estimated fuel savings for the vehicle for the trip and output for display the first fuel savings estimate.

These and other embodiments may optionally include one or more of the following features.

In various aspects, the instructions cause the driving insights module to perform further operations including receiving a second set of vehicle conditions at a second time, receiving a second fuel consumption database, and calculating a second fuel saving at a second driving segment of the trip based upon the second set of vehicle conditions and the second fuel consumption database. The generating the first fuel savings estimate can include adding the first fuel saving and the second fuel saving.

In various aspects, the instructions cause the driving insights module to perform further operations including, responsive to detecting the ignition off event, generating a second fuel savings estimate including a total estimated fuel savings for a life of the vehicle, and outputting for display the second fuel savings estimate.

In various aspects, the calculating the first fuel saving at the first driving segment of the trip is performed by looking up an estimated fuel consumption by an internal combustion engine using the first fuel consumption database based upon the first set of vehicle conditions, and subtracting an actual fuel consumption of the vehicle during the first driving segment from the estimated fuel consumption by the internal combustion engine.

In various aspects, the instructions cause the driving insights module to perform further operations including sending the first fuel savings estimate to a server for aggregation.

In various aspects, the instructions cause the driving insights module to perform further operations including sending the first fuel savings estimate to a server for access by a manufacturer of the vehicle.

In various aspects, the first set of vehicle conditions include at least two of a fuel consumption by the vehicle, an average speed of the vehicle, an elevation change of the vehicle, an acceleration of the vehicle, a road roughness, and a towing status.

In various aspects, the vehicle is an alternative power source vehicle, and the first fuel savings estimate includes a fuel savings compared to vehicle propelled solely via an internal combustion engine.

In another aspect, the subject matter may be embodied in a method. The method includes receiving, by a controller, a first set of vehicle conditions at a first time. The method further includes receiving, by the controller, a first fuel consumption database. The method further includes calculating, by the controller, a first fuel saving at a first driving segment of a trip based upon the first set of vehicle conditions and the first fuel consumption database. The method further includes, responsive to detecting an ignition off event, generating, by the controller, a first fuel savings estimate including an estimated fuel savings for the vehicle for the trip, and outputting, by the controller, for display the first fuel savings estimate.

In various aspects, the method further includes receiving, by the controller, a second set of vehicle conditions at a second time, receiving, by the controller, a second fuel consumption database, and calculating, by the controller, a second fuel saving at a second driving segment of the trip based upon the second set of vehicle conditions and the second fuel consumption database. The generating the first fuel savings estimate can include adding the first fuel saving and the second fuel saving.

In various aspects, the method further includes, responsive to detecting the ignition off event, generating a second fuel savings estimate including a total estimated fuel savings for a life of the vehicle, and outputting for display the second fuel savings estimate.

In various aspects, the method further includes looking up an estimated fuel consumption by an internal combustion engine using the first fuel consumption database based upon the first set of vehicle conditions, and subtracting an actual fuel consumption of the vehicle during the first driving segment from the estimated fuel consumption by the internal combustion engine.

In various aspects, the method further includes sending the first fuel savings estimate to a server for aggregation. In various aspects, the method further includes sending the first fuel savings estimate to a server for access by a manufacturer of the vehicle.

In various aspects, the method further includes receiving, by a server, fuel consumption data from a plurality of vehicles, organizing, by the server, the fuel consumption data into a plurality of categories, calculating, by the server, an average fuel consumption for each category, generating, by the server, the first fuel consumption database including the average fuel consumption for each category, receiving, by the server, a fuel consumption database request from the controller, and, responsive to receiving the fuel consumption database request, sending, by the server, the fuel consumption database to the controller.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

FIG. 2A and FIG. 2B provide a flow chart of example operations performed by a driving insights system according to an aspect of the invention.

FIG. 3 is a flow diagram of an example driving insights method which can be performed by the driving insights system of FIG. 1 according to an aspect of the invention.

FIG. 4 is a flow chart of example operations performed by a driving insights system according to an aspect of the invention.

DETAILED DESCRIPTION

Figure 1:
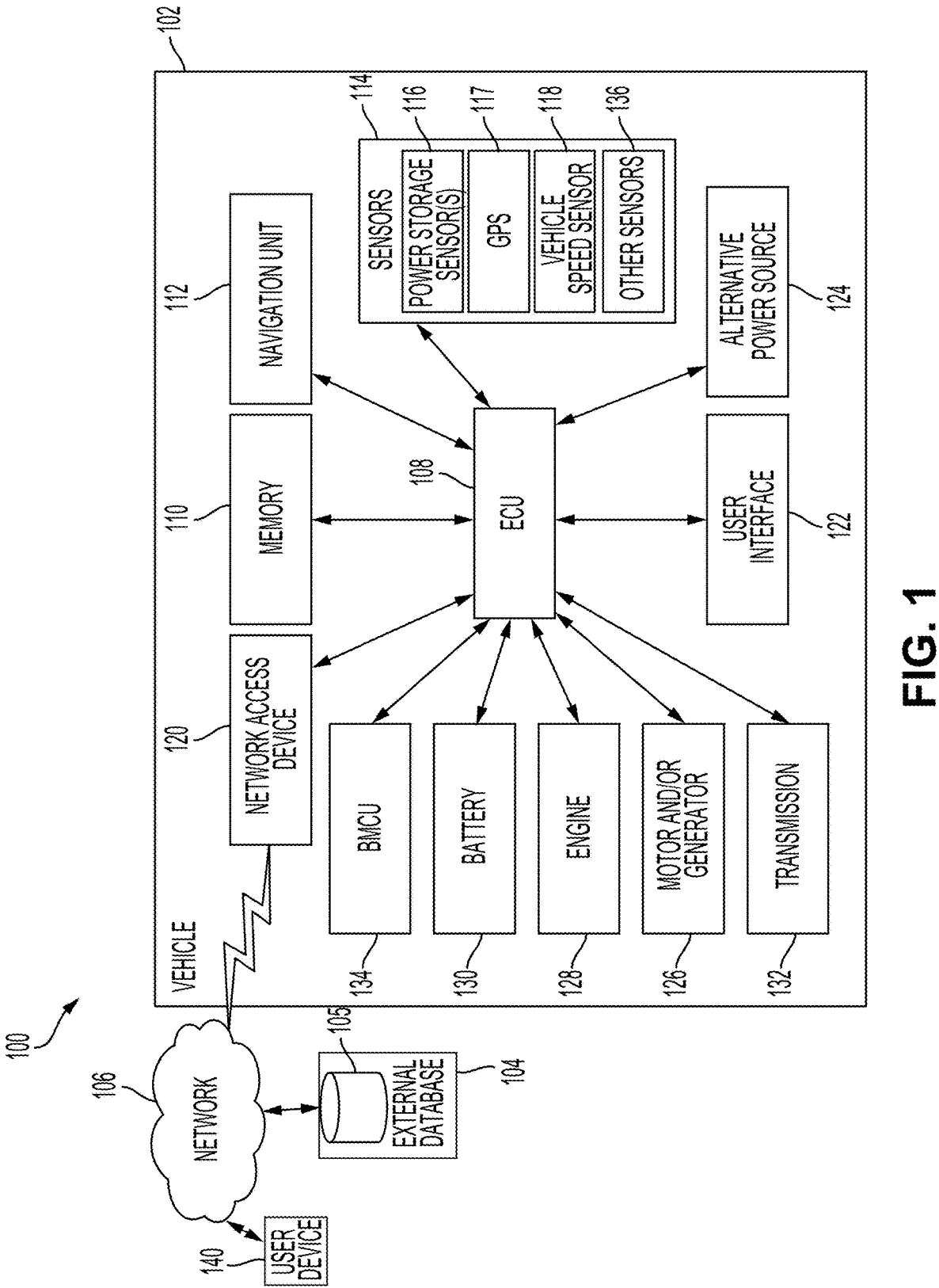
FIG. 1 is a block diagram of an example driving insights system according to an aspect of the invention.

Disclosed herein are systems, vehicles, and methods for providing driving insights including fuels savings by an alternative power source vehicle, such as an electric vehicle (EV), a battery electric vehicle (BEV), a fuel cell electric vehicle (FCEV), a hybrid vehicle, or any other vehicle not powered only by an internal combustion engine. A driving insights module can be programed to receive a set of vehicle conditions and/or fuel consumption data including, but not limited to, fuel consumption by the vehicle (which can include alternative fuel consumption, battery charge usage, etc.), average vehicle speed, elevation change, acceleration/deceleration data, road roughness, towing status, etc. The driving insights module can receive a fuel consumption database from memory or from a remote server and calculate a fuel savings of the vehicle based upon the set of vehicle conditions and the fuel consumption database. For example, the driving insights module can calculate the fuel saved by using an alternative power source compared to the fuel that would have been used by a vehicle operated only by an internal combustion engine. In response to detecting an ignition off event, the driving insights module can generate the fuel savings estimate and/or output for display the fuel savings estimate.

Particular embodiments of the subject matter described in this disclosure may be implemented to realize one or more of the following advantages. The driving insights module can provide fuel savings estimates to a vehicle operator so that the vehicle operator can keep track of fuel savings and consequently money savings by using the alternative power source vehicle. This data can reinforce the vehicle operator's decision to purchase the alternative power source vehicle which decision may have been made at least in part based on an expectation of fuel savings. The driving insights module can provide fuel savings estimates to a vehicle manufacturer which can be used for various beneficial activities. For example, the fuel savings data can be provided to consumers who are making a purchasing decision of a particular alternative power source vehicle. The fuel savings data can be used to track the health of the alternative power source. For example, a decline in fuel savings might indicate that the alternative power source should be serviced or replaced.

The driving insights system can utilize one or more supervised machine learning predictive models to take into account vehicle data and different environmental factors.

As defined herein, "internal combustion engine vehicle" or "ICE vehicle" can, in some aspects, be defined as a vehicle that receives power only from an internal combustion engine. In contrast to an ICE vehicle, other vehicles include EVs, BEVs, FCEVs, and hybrids. It should be understood that some hybrid vehicles use both an internal combustion engine and an alternative power source.

As defined herein, "real-time" can, in some aspects, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

FIG. 1 is a block diagram of a driving insights system 100. The driving insights system 100 may be retrofitted, coupled to, include or be included within a vehicle 102. The driving insights system 100 may couple to, connect to, or include a remote server 104. The remote server can be coupled to, include, or be included with an external database 105. The remote server 104 may include one or more processors or controllers specifically designed for processing the data received from the ECU 108. The driving insights system 100 may have a network 106 that links the server 104 and the external database 105 with the vehicle 102. The network 106 may be a local area network (LAN), a wide area network (WAN), a cellular network, the Internet, or combination thereof, that connects, couples and/or otherwise communicates between the vehicle 102 and the server 104 and/or external database 105.

The driving insights system 100 detects, generates, and/or identifies fuel savings associated with an alternative power source vehicle (e.g., a vehicle that is not powered purely by an internal combustion engine). The driving insights system 100 gathers information about a trip that the vehicle is undergoing in order to estimate a fuel savings as a result of the vehicle using an alternative power source 124. The information can include fuel consumption by the vehicle, average speed, elevation change, acceleration/deceleration, road roughness, towing conditions, etc.

The vehicle 102 can be a conveyance capable of transporting a person, an object, or a permanently or temporarily affixed apparatus. The vehicle 102 can be a self-propelled wheeled conveyance, such as a car, a sports utility vehicle, a truck, a bus, a van or other motor, battery or fuel cell driven vehicle. For example, the vehicle 102 may be an electric vehicle, a hybrid vehicle, a hydrogen fuel cell vehicle, a plug-in hybrid vehicle, or any other type of vehicle that has a fuel cell stack, a motor, and/or a generator. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may have and use one or more sensors and/or a navigation unit to drive autonomously.

The driving insights system 100 includes one or more processors, such as an electronic control unit (ECU) 108 and a memory 110. The driving insights system 100 may include other components, such as a navigation unit 112, one or more sensors 114 (also referred to herein as vehicle sensors) including one or more power storage sensors 116, one or more GPS sensors 117, one or more vehicle speed sensors 118, and/or other vehicle sensors 136, a network access device 120, and/or a user interface 122. Other sensors 136 can include an inertial measurement unit (IMU), an environmental temperature sensor, etc. The driving insights system 100 may couple, connect to, and/or include one or more vehicle components such as a motor and/or generator 126, an engine 128, a battery 130, the transmission 132, and/or a battery management control unit (BMCU) 134.

The ECU 108 may be implemented as a single ECU or as multiple ECUs. The ECU 108 may be electrically coupled to some or all of the other components within the vehicle 102, such as the motor and/or generator 126, the transmission 132, the engine 128, the battery 130, the BMCU 134, the memory 110, the network access device 120, and/or one or more sensors 114. The ECU 108 may include one or more processors or controllers specifically designed for detecting, generating, and/or identifying fuel savings associated with the vehicle 102.

The ECU 108 may be coupled to a memory 110 and can execute instructions that are stored in the memory 110. The memory 110 may be coupled to the ECU 108 and store instructions that the ECU 108 executes. The memory 110 may include one or more of a Random Access Memory (RAM) or other volatile or non-volatile memory. The memory 110 may be a non-transitory memory or a data storage device, such as a hard disk drive, a solid-state disk drive, a hybrid disk drive, or other appropriate data storage, and may further store machine-readable instructions, which may be loaded and executed by the ECU 108. Moreover, the memory 110 may be used to record and store data before, after, and/or during the determination of fuel savings during a trip and/or cumulatively over the life of the vehicle 102.

The driving insights system 100 may include a user interface 122. The driving insights system 100 may display one or more notifications on the user interface 122. The one or more notifications on the user interface 122 may notify occupants of the vehicle when the driving insights system 100 is initialized or activated. The user interface 122 may include an input/output device that receives user input from a user interface element, a button, a dial, a microphone, a keyboard, and/or a touch screen. For example, the user interface 122 may receive user input that may include configurations as to the amount, the type, and/or the units of data displayed to a vehicle user. Other configurations may include a user device, such as a smartphone, to which the data can be sent for viewing remotely from the vehicle, for example.

The network access device 120 may be used to contact the owner of the vehicle and/or a manufacturer of the vehicle to provide fuel savings to such entities. The network access device 120 may include a communication port or channel, such as one or more of a Wi-Fi unit, a Bluetooth® unit, a radio frequency identification (RFID) tag or reader, or a cellular network unit for accessing a cellular network (such as 3G, 4G or 5G). The network access device 120 may transmit data to and receive data from the remote server 104 and/or the external database 105. For example, the ECU 108 may communicate with the remote server 104 and/or the external database 105 to obtain one or more fuel consumption databases associated with the vehicle 102, via the network 106. The driving insights system 100 may use the fuel consumption database(s) to generate and/or estimate fuel savings associated with use of an alternative power source 124 of the vehicle 102.

The network access device 120 may transmit data to and receive data from a user device 140 (e.g., a smart phone, a tablet, a personal computer, etc.) located remotely from the vehicle 102. The driving insights system 100 may display one or more notifications on the user device 140, similar to user interface 122. Accordingly, the user device 140 can have a user interface whereby a user can communicate with the ECU 108 from a remote location.

The driving insights system may further include a navigation unit 112. The navigation unit 112 may be integral to the vehicle 102 or a separate unit coupled to the vehicle 102, such as a personal device with navigation capabilities. When the navigation unit 112 is separate from the vehicle 102, the navigation unit 112 may communicate with the vehicle 102 via the network access device 120. In some implementations, the vehicle 102 may include a GPS unit for detecting location data including a current location of the vehicle 102 and date/time information instead of the navigation unit 112. In that regard, the ECU 108 may perform the functions of the navigation unit 112 based on data received from the GPS unit. At least one of the navigation unit 112 or the ECU 108 may predict or propose a route set that includes a starting location and a destination location. The navigation unit 112 or the ECU 108 may perform navigation functions. Navigation functions may include, for example, route and route set prediction, providing navigation instructions, and receiving user input such as verification of predicted routes and route sets or destinations. Other information, such as a current speed and/or acceleration of the vehicle 102, may be extrapolated, interpreted, or otherwise calculated from the data obtained from the navigation unit.

The navigation unit 112 may provide and obtain navigational map information including location data, which may include a current location, a starting location, a destination location and/or a route between the starting location or current location and the destination location of the vehicle 102. The navigation unit 112 may include a memory (not shown) for storing the route data. The navigation unit 112 may receive data from other sensors capable of detecting data corresponding to location information. For example, the other sensors may include a gyroscope or an accelerometer.

The navigational map information may include entity information. The entity information may include locations or places of interest, such as government buildings, commercial businesses, schools, tourist attractions, or other places of interest. The navigational map information may further include road condition and/or type. The road condition and/or type may be used by the driving insights system 100 for calculating and/or estimating fuel consumption.

The power storage sensors 116 can include one or more voltage sensors, one or more current sensors, a fluid level sensor, and/or any other suitable sensor for detecting power storage levels. The type of power storage sensor 116 may depend on the type of alternative power source 124. For example, the alterative power source 124 can include one or more batteries and/or an alternative fuel storage (e.g., propane storage, natural gas storage, hydrogen storage, etc.). In various aspects, the alternative power source 124 stores chemical energy using battery 130.

The one or more vehicle speed sensors 118 can measure the amount of rotation of one or more of the multiple wheels of the vehicle 102 to determine a speed of the vehicle 102, which can also be used to determine whether the vehicle 102 is stationary and/or parked. The one or more sensors 114 may include other sensors 136 to measure road condition(s), the weather, the ambient lighting surrounding the vehicle 102, or other environmental factors that may be used to predict fuel consumption. For example, the other sensors 136 can include a gyroscope and/or accelerometer for measuring attitude and/or acceleration of the vehicle 102.

The motor and/or generator 126 may convert electrical energy into mechanical power, such as torque, and may convert mechanical power into electrical energy. The motor and/or generator 126 may be coupled to the battery 130. The motor and/or generator 126 may convert the energy from the battery 130 into mechanical power, and may provide energy back to the battery 130, for example, via regenerative braking. In some implementations, the vehicle 102 may include one or more additional power generation devices such as the engine 128 or a fuel cell stack. The engine 128 combusts fuel to provide power instead of and/or in addition to the power supplied by the motor and/or generator 126.

The battery 130 may be coupled to the motor and/or generator 126 and may provide electrical energy to and receive electrical energy from the motor and/or generator 126. The battery 130 may include one or more rechargeable batteries.

The BMCU 134 may be coupled to the battery 130 and may control and manage the charging and discharging of the battery 130. The BMCU 134, for example, may measure, using battery sensors, parameters used to determine the state of charge (SOC) of the battery 130. The BMCU 134 may control the battery 130.

The one or more vehicle components may include the transmission 132. The transmission 132 may have different gears and/or modes, such as park, drive and/or neutral and may shift between the different gears. The transmission 132 manages the amount of power that is provided to the wheels of the vehicle 102 given an amount of speed.

The driving insights system 100 may include or be coupled to the external database 105. A database is any collection of pieces of information that is organized for search and retrieval, such as by a computer, and the database may be organized in tables, schemas, queries, reports, or any other data structures. A database may use any number of database management systems. The external database 105 may include a third-party server or website that stores or provides information. The information may include real-time information, periodically updated information, or user-inputted information. A server may be a computer in a network that is used to provide services, such as accessing files or sharing peripherals, to other computers in the network.

The external database 105 may store personalized driver data, vehicle data, machine learning models, and/or machine learning training algorithms models, among other data. The external database 105 may be updated and/or provide updates in real-time. The external database 105 may store and/or provide the driver data, vehicle data, and/or machine learning algorithms/models to the ECU 108. The external database 105 may also store environmental factors, such as weather information or time of day information, and provide the environmental factors to the ECU 108 to assist in calculating fuel consumption and/or fuel savings. The weather information may include the temperature, wind, humidity, road conditions, amount of precipitation, and/or other weather factors that may affect the determination of fuel consumption.

The ECU 108 may analyze sensor feedback from the sensors 114 of the vehicle 102, among other data, and apply these inputs into a fuel savings calculation algorithm for fuel consumption and/or savings calculations. In various aspects, the fuel savings algorithm can include a machine learning model.

Figure 2A:
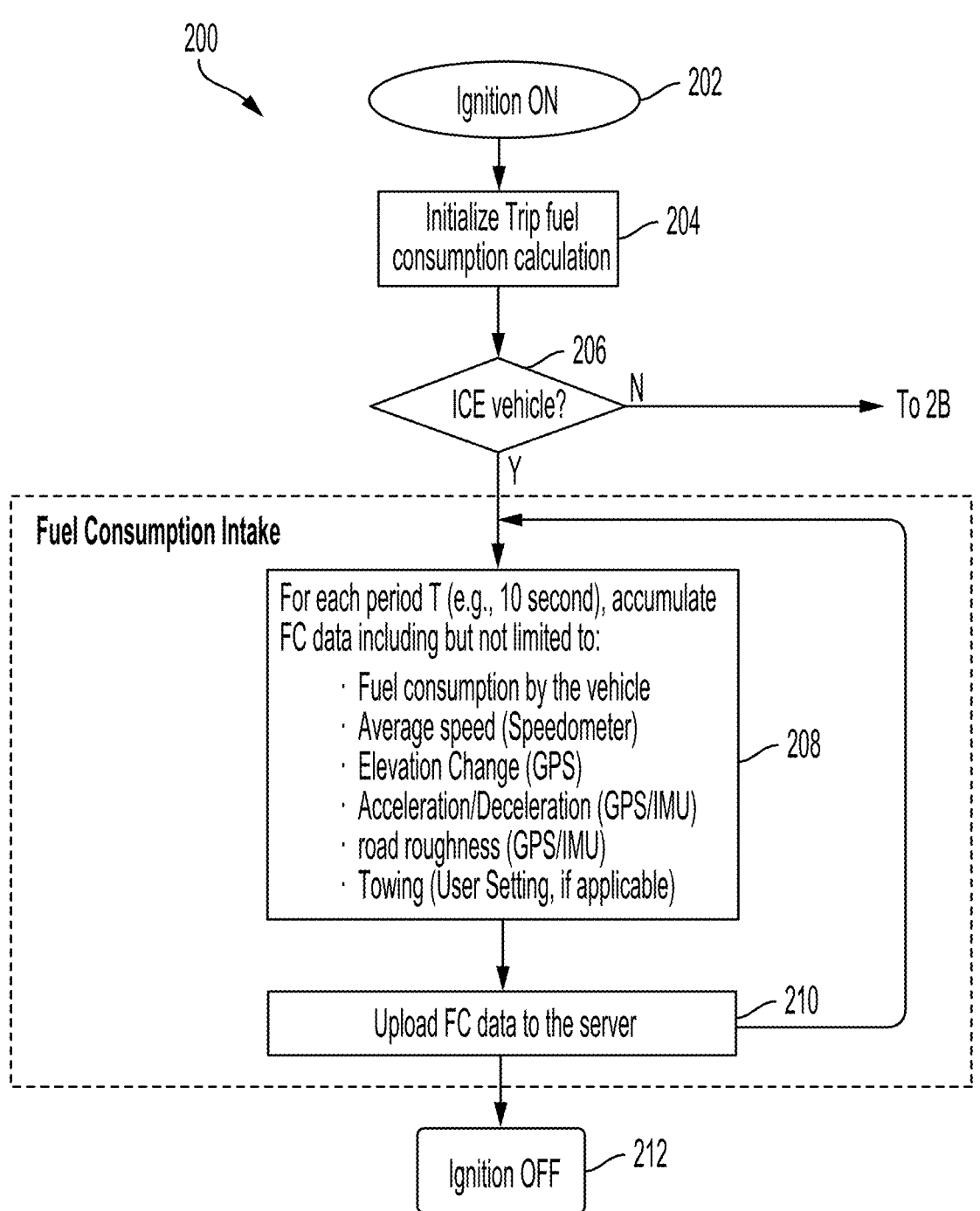

FIG. 2A and FIG. 2B is a flow chart for a method 200 for providing driving insights. One or more computers or one or more data processing apparatuses, for example, the ECU 108 of the driving insights system 100 of FIG. 1, appropriately programmed, may implement aspects of the illustrated block diagram.

With combined reference to FIG. 1 and FIG. 2A, at operation 202, the ECU 108 may check if the ignition has been switched on (e.g., start of ignition cycle). The ignition on condition may be initiated by turning a key to a run position or engaging a start button. If the ignition is not switched on, the system may continue to monitor for the ignition on condition. If the ignition is switched on, operation 204 may be performed. An ignition on condition may be indicative of a start of a trip or drive cycle.

At operation 204, the in-vehicle components of the data collection and analytics system may be initialized. The ECU 108 may initialize various parameters and variables. For example, counter values may be initialized to zero. The ECU 108 may record a trip start time, a trip start location, and/or a trip start odometer value.

At operation 206, the ECU 108 may determine whether the vehicle 102 is an internal combustion engine vehicle. Stated differently, the ECU 108 may determine whether the vehicle 102 uses an alternative power source or is an ICE vehicle. In response to detecting that the vehicle 102 is an ICE vehicle, operation 208 may be performed.

At operation 208, the ECU 108 may determine or calculate fuel consumption data. The fuel consumption data can be determined in intervals (e.g., every 10 seconds, every 30 seconds, every minute, etc.) and accumulated over time for the trip or drive cycle. The ECU 108 can accumulate fuel consumption data including, but not limited to, fuel consumption by the vehicle (e.g., gallons of fuel), average speed (e.g., speedometer readings), elevation change (e.g., GPS data), acceleration/deceleration data (e.g., GPS/inertial measurement unit (IMU)), road roughness (GPS/IMU), and/or towing status (user setting, if applicable). Operation 208 can be repeated at predetermined intervals to continually track fuel consumption during a trip or drive cycle.

At operation 210, the ECU 108 can send the fuel consumption data to the remote server 104 for further processing and/or storage. This fuel consumption data can be used for generating and/or updating the fuel consumption database described at operation 214.

At operation 212, the system may transition to ignition off. The ECU 108 may perform instructions to control shutdown of the powertrain and vehicle systems. The ECU 108 may then await the next ignition on cycle.

With combined reference to FIG. 1 and FIG. 2B, in response to detecting that the vehicle 102 is not an ICE vehicle, operation 214 may be performed. At operation 214, the ECU 108 may retrieve one or more fuel consumption databases from the server 104. The fuel consumption database can include fuel consumption by an ICE vehicle for various driving conditions.

At operation 216, the ECU 108 may determine or calculate fuel consumption data of the vehicle 102 over a predetermined period. The fuel consumption data can be determined in intervals (e.g., every 10 seconds, every 30 seconds, every minute, etc.) and accumulated over time for the trip or drive cycle. The ECU 108 can accumulate fuel consumption data including, but not limited to, fuel consumption by the vehicle ($F_i$), average speed (e.g., speedometer readings), elevation change (e.g., GPS data), acceleration/deceleration data (e.g., GPS/inertial measurement unit (IMU)), road roughness (GPS/IMU), and/or towing status (user setting, if applicable).

At operation 218, the ECU 108 may look up fuel consumption of an ICE vehicle ($F_{ice_i}$) based on the fuel consumption data received and/or determined at operation 216. For example, the fuel consumption database can include average fuel consumed by an ICE vehicle based on various vehicle and driving conditions. For example, fuel consumption can vary based upon average speed, elevation change, acceleration/deceleration, road roughness, and towing status, among other factors. In this regard, the ECU 108 can use the fuel consumption data acquired at operation 216 to estimate the amount of fuel that would have been consumed by a similar vehicle using only the internal combustion engine as a power source (i.e., an ICE vehicle). This fuel consumption estimate ($F_{ice_i}$) can then be compared to the actual fuel consumption of the vehicle 102, which may have used an alternative power source (e.g., hydrogen, batteries, etc.) during the relevant interval.

At operation 220, the ECU 108 may calculate the fuel savings at the $i_{th}$ driving segment by subtracting the actual fuel consumption of the vehicle 102 determined at operation 216 from the fuel consumption of an ICE vehicle determined at operation 218. For example, using equation 1 as follows:

$$\Delta F_i = F_{ice_i} - F_i \qquad \text{Eq. 1}$$

$\Delta F_i$ is the fuel saved during interval (i) by using the alternative fuel vehicle 102 as opposed to an ICE vehicle. $F_{ice_i}$ is the fuel consumption of an ICE vehicle during interval (i) based on the fuel consumption data received and/or determined at operation 216 and the fuel consumption database received at step 214. $F_i$ is the fuel consumption by the vehicle 102 over the interval (i). For example, if the vehicle 102 is a pure electric vehicle, then the fuel consumption (in gallons), $F_i$, may be zero. The interval (i) can be a duration of time between fuel savings calculations at operation 220. Operations 216, 218, and 220 can be repeated at predetermined intervals (i) to continually track fuel consumption during a trip or drive cycle. By continually updating fuel consumption data at operation 216, the changes in driving conditions over a trip or drive cycle are accounted for thereby increasing accuracy of the fuel savings calculation.

In various aspects, the ECU 108 can calculate the usage of the alternative power source during each trip or drive cycle, in addition to calculating alternative power usage over the lifetime of the vehicle 102. In this manner, the ECU 108 can output for display alternative power usage as a percentage of total drive time (e.g., in the case of a hybrid vehicle).

In various aspects, the fuel savings calculation focuses on the gallons of gas saved by using the alternative source vs gallons of gas used by an ICE during the driving, i.e., savings using the alternative source. In various aspects, the cost of alternative fuel used during the driving is calculated by the user. The systems and methods can include additional steps whereby local energy costs are received and calculated by the ECU 108.

At operation 222, the system may transition to ignition off. The ECU 108 may perform instructions to control shutdown of the powertrain and vehicle systems. The ECU 108 may then await the next ignition on cycle.

At operation 224, the ECU 108 may calculate total fuel savings (F) over the trip or drive cycle by calculating the total sum of each of the fuel savings ($\Delta F_j$) calculated at each of the operations 220. For example, using equation 2 as follows:

$$F = \sum_{j=1}^{i} \Delta F_j \qquad \text{Eq. 2}$$

At operation 226, the ECU 108 may output for display the total fuel savings (F). For example, the ECU 108 may output the total fuel savings (F) for display on the user interface 122 for viewing by an occupant of the vehicle. The ECU 108 may output the total fuel savings (F) for display on the user device 140 for viewing by a user or owner of the vehicle. The ECU 108 may output the total fuel savings (F) to the server 104 for further aggregation. The ECU 108 may output the total fuel savings (F) to the server 104 for use by a manufacturer of the vehicle 102.

FIG. 3 is a flow diagram of an example process 300 for providing driving insights. One or more computers or one or more data processing apparatuses, for example, the ECU 108 of the driving insights system 100 of FIG. 1, appropriately programmed, may implement the process 300. Various aspects of the process 300 are similar to the process described with respect to FIG. 2A and FIG. 2B.

At step 302, a controller (e.g., the ECU 108) may receive a first set of vehicle conditions (used interchangeable with "fuel consumption data") at a first time. Step 302 can be similar to operation 216 of FIG. 2B.

At step 304, the controller can receive a first fuel consumption database from a remote server and/or from memory. Step 304 can be similar to operation 214 of FIG. 2B.

At step 306, the controller can calculate a first fuel savings at a first driving segment of a trip based upon the first set of vehicle conditions (see step 302) and the first fuel consumption database (see step 304). Step 304 can be similar to operation 220 of FIG. 2B.

At step 308, the controller can generate a first fuel savings estimate including an estimated fuel savings for the vehicle for the trip or drive cycle. Step 308 can be similar to operation 224 of FIG. 2B.

At step 310, the controller can output for display the first fuel savings estimate. Step 308 can be similar to operation 226 of FIG. 2B.

Steps 302 through 306 can be repeated at predetermined intervals during a trip or drive cycle of the vehicle 102. Steps 302 through 310 can be repeated each trip or drive cycle of the vehicle to provide accumulated fuel savings over the life of the vehicle 102.

FIG. 4 is a flow chart for a method 400 for building a fuel consumption database. One or more computers or one or more data processing apparatuses, for example, the ECU 108 of the driving insights system 100 of FIG. 1, appropriately programmed, may implement aspects of the illustrated block diagram.

With combined reference to FIG. 1 and FIG. 4, at operation 402, a controller (e.g., the server 104) may classify fuel consumption data into categories $C_1$, $C_2$, . . . $C_N$. Example categories include average speed of the vehicle, elevation change, acceleration/deceleration of the vehicle, road roughness, towing status, etc. In this manner, the fuel consumption database can be readily searchable using vehicle data for specific categories.

At operation 404, the controller can receive fuel consumption data from a plurality of vehicles.

At operation 406, the controller can calculate the average fuel consumption in each category. For the $i_{th}$ category, the average fuel consumption, $C_i$, can be calculated using equation 3:

$$FC_i = \frac{1}{M} \sum_{j=1}^{M} FC_{i_j} \qquad \text{Eq. 3}$$

M is the total number of vehicles in the $i_{th}$ category.

At operation 408, the controller can update the average fuel consumption, $C_i$, to the fuel consumption database associated with $FC_i$. For example, the controller can save the updated fuel consumption database in the external database 105.

At operation 410, the controller can receive a fuel consumption database request from a vehicle. For example, the server 104 can receive a fuel consumption database request from the vehicle 102. The fuel consumption database request can be sent to the server 104 as part of operation 214 as described in FIG. 2B, in accordance with various aspects.

At operation 412, and responsive to operation 410, the controller can send the fuel consumption database to the requested vehicle. For example, responsive to receiving the fuel consumption database request, the sever 104 can send the fuel consumption database to the vehicle 102. Using the fuel consumption database, the alternative fuel vehicle can calculate the fuel savings, for example as described with respect to FIG. 2A through FIG. 3.

In various aspects, the ECU 108 and/or the server 104 can send a fuel savings report to the user device 140 (e.g., daily, weekly, or monthly). The fuel savings report can include distance driven by the vehicle, total fuel consumption, fuel (e.g., gallons) saved by driving the alternative fuel vehicle (e.g., electric vehicle, hybrid, etc.). If the fuel saved is much less (e.g., below a threshold) compared to historic data, the ECU 108 and/or the server 104 may run a check on the capacity of the alternative power source 124 and may alert the driver if maintenance and/or replacement is suggested.

Figure 5:
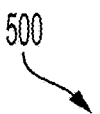
FIG. 5 is a schematic view of a graphical user interface generated by a driving insights system according to an aspect of the invention.

FIG. 5 is an example graphical user interface 500 for displaying driving insights data to a user, in accordance with various aspects. With momentary combined reference to FIG. 1 and FIG. 5, the graphical user interface 500 can be displayed on a device such as the user interface 122 or the user device 140 (e.g., a smartphone) or any other suitable interface as desired. The graphical user interface 500 can be displayed as a result of step 310 (see FIG. 3) or operation 226 (see FIG. 2B). The graphical user interface 500 can include various information about the vehicle such as the VIN number, current odometer reading, distance to empty, vehicle status, etc. The graphical user interface 500 can include driving insights as it relates to use of alternative power sources. For example, the graphical user interface 500 can include information such as driving time using an alternative power source (e.g., EV time). The graphical user interface 500 can further include a total fuel savings as a results of alternative power source driving time. In the illustrated embodiment, the graphical user interface 500 recites as an example "You've saved 128 gallons of gas by choosing Toyota hybrid." The fuel savings can be displayed in terms of gallons of gas, in terms of money savings, or any other suitable measure of savings. The total fuel savings can be updated each trip or drive cycle or any other suitable frequency (e.g., hourly, daily, etc.). Accordingly, the graphical user interface 500 can display to a user fuel savings driving insights.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. The benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for providing driving insights with alternative power sources, the system comprising:
   a driving insights module having a processor; and
   a tangible, non-transitory memory configured to communicate with the processor, the tangible, non-transitory memory having instructions stored thereon that, in response to execution by the processor, cause the driving insights module to perform operations comprising:

receive a first set of vehicle conditions for an alternative power source vehicle at a first time, the alternative power source vehicle including an alternative power source configured to propel the vehicle in addition to or instead of an internal combustion engine, the first set of vehicle conditions include at least two of a fuel consumption by the vehicle, an average speed of the vehicle, an elevation change of the vehicle, an acceleration of the vehicle, a road roughness, and a towing status;
   receive a first fuel consumption database including average fuel consumption values for an internal combustion engine vehicle for a plurality of categories of driving conditions, the plurality of categories including categories based on at least the average speed of the vehicle and the elevation change of the vehicle, the first fuel consumption database having been generated by a server using fuel consumption data received from a plurality of vehicles and organized into the plurality of categories, and transmitted from the server to the driving insights module responsive to a fuel consumption database request from the driving insights module;
   calculate a first fuel saving at a first driving segment of a trip based upon the first set of vehicle conditions and the first fuel consumption database, including by determining, from the first fuel consumption database and based on the first set of vehicle conditions, an estimated fuel consumption by the internal combustion engine vehicle during the first driving segment and subtracting an actual fuel consumption of the alternative power source vehicle during the first driving segment from the estimated fuel consumption by the internal combustion engine vehicle;
   responsive to detecting an ignition off event:
      generate a first fuel savings estimate including an estimated fuel savings for the alternative power source vehicle for the trip; and
      output for display the first fuel savings estimate.

2. The system of claim 1, wherein the instructions cause the driving insights module to perform further operations comprising:
   receive a second set of vehicle conditions for the alternative power source vehicle at a second time, the second set of vehicle conditions including at least two of a second fuel consumption by the vehicle, a second average speed of the vehicle, a second elevation change of the vehicle, a second acceleration of the vehicle, a second road roughness, and a second towing status;
   receive a second fuel consumption database; and
   calculate a second fuel saving at a second driving segment of the trip based upon the second set of vehicle conditions and the second fuel consumption database;
   wherein the generating the first fuel savings estimate includes adding the first fuel saving and the second fuel saving.

3. The system of claim 2, wherein the instructions cause the driving insights module to perform further operations comprising:
   responsive to detecting the ignition off event:
      generate a second fuel savings estimate including a total estimated fuel savings for a life of the vehicle; and
      output for display the second fuel savings estimate.

4. The system of claim 1, wherein the calculating the first fuel saving at the first driving segment of the trip is performed by:

looking up an estimated fuel consumption by an internal combustion engine using the first fuel consumption database based upon the first set of vehicle conditions; and subtracting an actual fuel consumption of the vehicle during the first driving segment from the estimated fuel consumption by the internal combustion engine.

5. The system of claim 1, wherein the instructions cause the driving insights module to perform further operations comprising:

send the first fuel savings estimate to a server for aggregation.

6. The system of claim 1, wherein the instructions cause the driving insights module to perform further operations comprising:

send the first fuel savings estimate to a server for access by a manufacturer of the vehicle.

7. A vehicle comprising:

an alternative power source configured to propel the vehicle in addition to or instead of an internal combustion engine; and a driving insights module programmed to:

receive a first set of vehicle conditions for the vehicle at a first time, the first set of vehicle conditions including at least two of a fuel consumption by the vehicle, an average speed of the vehicle, an elevation change of the vehicle, an acceleration of the vehicle, a road roughness, and a towing status;

receive a first fuel consumption database including average fuel consumption values for an internal combustion engine vehicle for a plurality of categories of driving conditions, the plurality of categories including categories based on at least the average speed of the vehicle and the elevation change of the vehicle, the first fuel consumption database having been generated by a server using fuel consumption data received from a plurality of vehicles and organized into the plurality of categories, and transmitted from the server to the driving insights module responsive to a fuel consumption database request from the driving insights module;

calculate a first fuel saving at a first driving segment of a trip based upon the first set of vehicle conditions and the first fuel consumption database, including by determining, from the first fuel consumption database and based on the first set of vehicle conditions, an estimated fuel consumption by the internal combustion engine vehicle during the first driving segment and subtracting an actual fuel consumption of the alternative power source vehicle during the first driving segment from the estimated fuel consumption by the internal combustion engine vehicle;

responsive to detecting an ignition off event:

generate a first fuel savings estimate including an estimated fuel savings for the vehicle for the trip; and output for display the first fuel savings estimate.

8. The vehicle of claim 7, wherein the vehicle is an alternative power source vehicle, and the first fuel savings estimate includes a fuel savings compared to an internal combustion engine vehicle.

9. The vehicle of claim 7, wherein the driving insights module is further programmed to:

receive a second set of vehicle conditions at a second time, the second set of vehicle conditions including at least two of a second fuel consumption by the vehicle, a second average speed of the vehicle, a second elevation change of the vehicle, a second acceleration of the vehicle, a second road roughness, and a second towing status;

receive a second fuel consumption database; and calculate a second fuel saving at a second driving segment of the trip based upon the second set of vehicle conditions and the second fuel consumption database;

wherein the generating the first fuel savings estimate includes adding the first fuel saving and the second fuel saving.

10. The vehicle of claim 9, wherein the driving insights module is further programmed to:

responsive to detecting the ignition off event:

generate a second fuel savings estimate including a total estimated fuel savings for a life of the vehicle; and output for display the second fuel savings estimate.

11. The vehicle of claim 7, wherein the calculating the first fuel saving at the first driving segment of the trip is performed by:

looking up an estimated fuel consumption by an internal combustion engine using the first fuel consumption database based upon the first set of vehicle conditions; and subtracting an actual fuel consumption of the vehicle during the first driving segment from the estimated fuel consumption by the internal combustion engine.

12. The vehicle of claim 7, wherein the driving insights module is further programmed to send the first fuel savings estimate to a server for aggregation.

13. The vehicle of claim 7, wherein the driving insights module is further programmed to send the first fuel savings estimate to a server for access by a manufacturer of the vehicle.

14. The vehicle of claim 7, wherein calculating the first fuel saving comprises determining the first fuel saving repeatedly over a plurality of time intervals during the trip and summing the fuel savings from the plurality of time intervals.

15. A method comprising:

receiving, by a controller of an alternative power source vehicle that includes an alternative power source configured to propel the vehicle in addition to or instead of an internal combustion engine, a first set of vehicle conditions for the alternative power source vehicle at a first time, the first set of vehicle conditions including at least two of a fuel consumption by the vehicle, an average speed of the vehicle, an elevation change of the vehicle, an acceleration of the vehicle, a road roughness, and a towing status;

receiving, by the controller, a first fuel consumption database including average fuel consumption values for an internal combustion engine vehicle for a plurality of categories of driving conditions, the plurality of categories including categories based on at least the average speed of the vehicle and the elevation change of the vehicle, the first fuel consumption database having been generated by a server using fuel consumption data received from a plurality of vehicles and organized into the plurality of categories, and transmitted from the server to the controller responsive to a fuel consumption database request from the controller;

calculating, by the controller, a first fuel saving at a first driving segment of a trip based upon the first set of vehicle conditions and the first fuel consumption database, including by determining, from the first fuel consumption database and based on the first set of vehicle conditions, an estimated fuel consumption by the internal combustion engine vehicle during the first driving segment and subtracting an actual fuel consumption of the vehicle during the first driving segment from the estimated fuel consumption by the internal combustion engine vehicle;

responsive to detecting an ignition off event:

generating, by the controller, a first fuel savings estimate including an estimated fuel savings for the vehicle for the trip; and outputting, by the controller, for display the first fuel savings estimate.

16. The method of claim 15, further comprising:

receiving, by the controller, a second set of vehicle conditions for the alternative power source at a second time, the second set of vehicle conditions including at least two of a second fuel consumption by the vehicle, a second average speed of the vehicle, a second elevation change of the vehicle, a second acceleration of the vehicle, a second road roughness, and a second towing status;

receiving, by the controller, a second fuel consumption database; and calculating, by the controller, a second fuel saving at a second driving segment of the trip based upon the second set of vehicle conditions and the second fuel consumption database;

wherein the generating the first fuel savings estimate includes adding the first fuel saving and the second fuel saving.

17. The method of claim 16, further comprising:

responsive to detecting the ignition off event:

generating a second fuel savings estimate including a total estimated fuel savings for a life of the vehicle; and outputting for display the second fuel savings estimate.

18. The method of claim 15, further comprising:

looking up an estimated fuel consumption by an internal combustion engine using the first fuel consumption database based upon the first set of vehicle conditions; and subtracting an actual fuel consumption of the vehicle during the first driving segment from the estimated fuel consumption by the internal combustion engine.

19. The method of claim 15, further comprising sending the first fuel savings estimate to the server for at least one of (i) aggregation or (ii) access by a manufacturer of the vehicle.

20. The method of claim 15, further comprising:

receiving, by the server, fuel consumption data from a plurality of vehicles;

organizing, by the server, the fuel consumption data into a plurality of categories;

calculating, by the server, an average fuel consumption for each category;

generating, by the server, the first fuel consumption database including the average fuel consumption for each category;

receiving, by the server, the fuel consumption database request from the controller; and responsive to receiving the fuel consumption database request, sending, by the server, the first fuel consumption database to the controller.

\* \* \* \* \*